United States Patent [19]
Combier

[11] Patent Number: 5,226,931
[45] Date of Patent: Jul. 13, 1993

[54] PROCESS FOR SUPPLYING NITROGEN FROM AN ON-SITE PLANT

[75] Inventor: Alain Combier, Westmount, Canada

[73] Assignee: Canadian Liquid Air Ltd. -Air Liquide Canada Ltee., Montreal, Canada

[21] Appl. No.: 782,325

[22] Filed: Oct. 24, 1991

[51] Int. Cl.⁵ .................. B01D 53/22; B01D 53/04
[52] U.S. Cl. ................................. 55/16; 55/25; 55/68; 55/158; 55/387
[58] Field of Search ............ 55/16, 25, 26, 68, 158

[56] References Cited

U.S. PATENT DOCUMENTS

| | | |
|---|---|---|
| 3,339,341 | 9/1967 | Maxwell et al. ............... 55/16 |
| 3,493,296 | 2/1970 | Albert .......................... 350/302 |
| 3,866,428 | 2/1975 | Simonet et al. ............... 55/75 X |
| 4,556,180 | 12/1985 | Manatt .......................... 55/158 X |
| 4,681,602 | 7/1987 | Glenn et al. ................... 55/16 X |
| 4,684,377 | 8/1987 | Haruna et al. ................. 55/58 X |
| 4,781,907 | 11/1988 | McNeill ......................... 55/16 X |
| 4,810,265 | 3/1989 | Legree et al. .................. 55/26 |
| 4,883,023 | 11/1989 | Tsang et al. ................... 55/16 X |
| 4,894,068 | 1/1990 | Rice .............................. 55/16 |
| 4,931,070 | 6/1990 | Prasad ........................... 55/16 |
| 4,934,148 | 6/1990 | Prasad et al. .................. 55/16 X |
| 5,015,271 | 5/1991 | Reiss ............................. 55/58 X |
| 5,035,726 | 7/1991 | Chen et al. ..................... 55/16 |

Primary Examiner—Robert Spitzer
Attorney, Agent, or Firm—Oblon, Spivak, McClelland, Maier & Neustadt

[57] ABSTRACT

A process is provided for supplying nitrogen from an on-site air separation plant providing at least oxygen as a product, which entails feeding an air feed stream to an instrument-air compressor which is oversized relative to compressed air needed to feed an instrument controlling the plant, feeding at least a portion of the compressed air stream from the instrument-air compressor to a nitrogen membrane separator, thereby providing a stream of nitrogen product, and venting an oxygen-enriched air stream from the membrane.

25 Claims, 4 Drawing Sheets

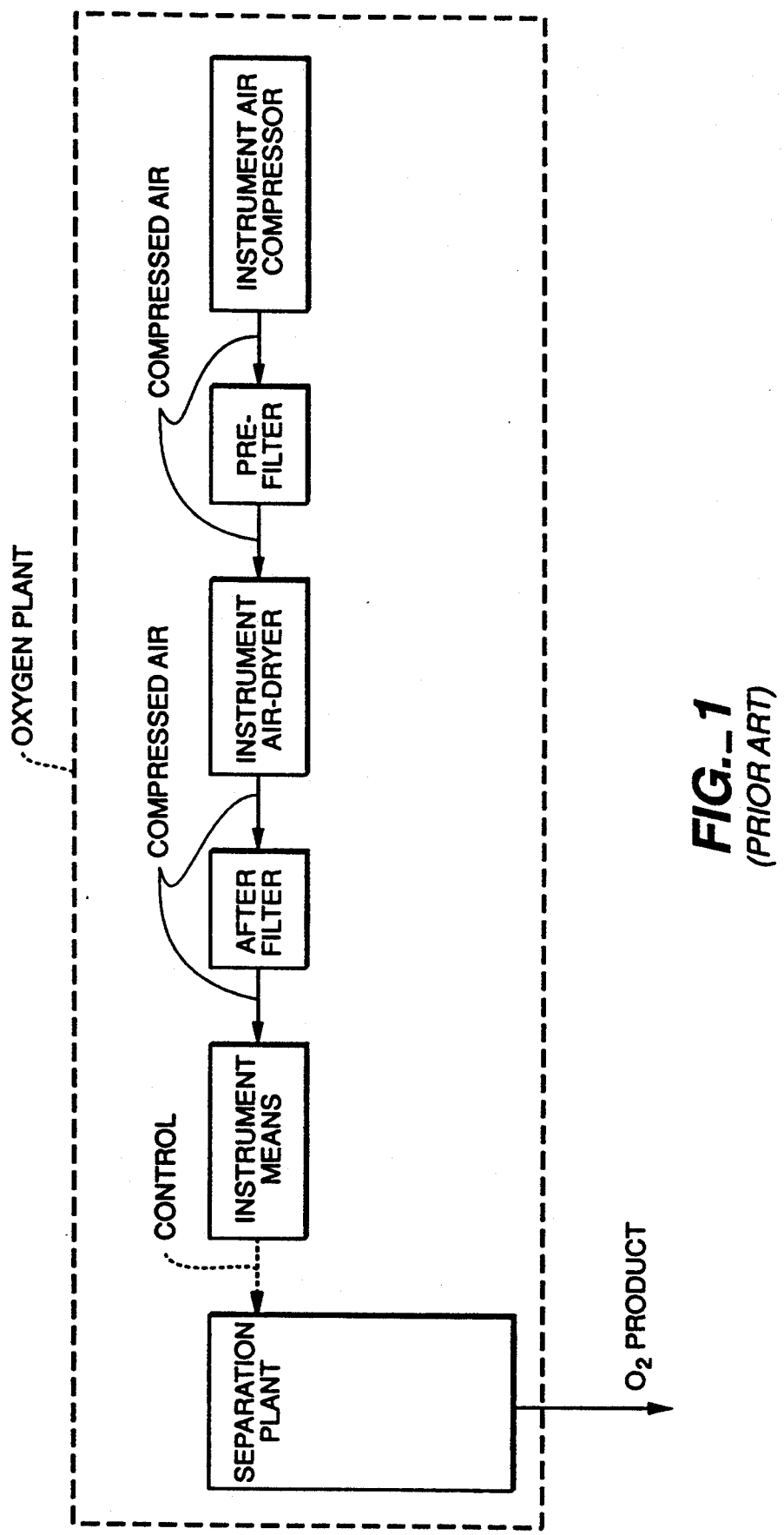
FIG._1
(PRIOR ART)

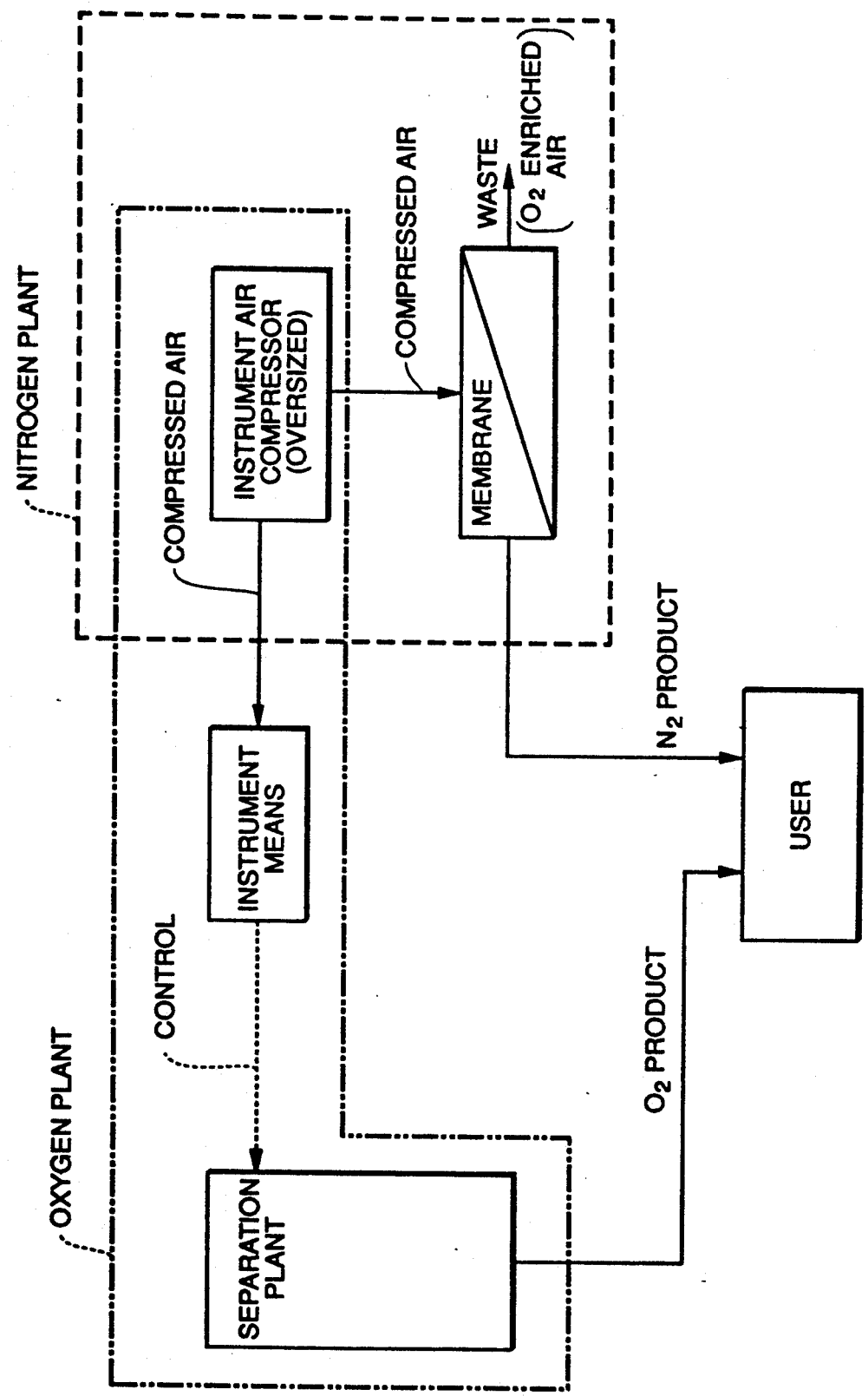
FIG._2

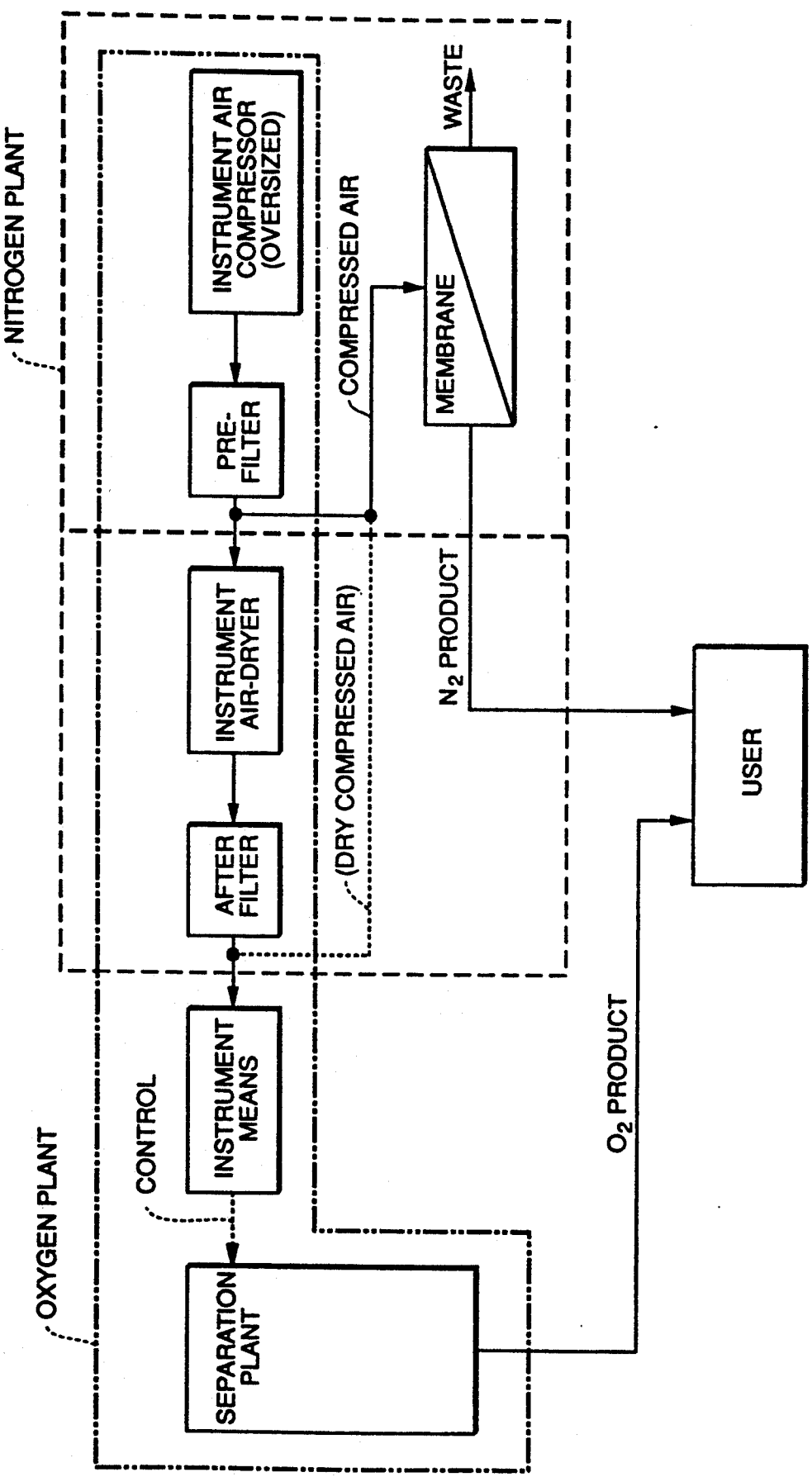
FIG._3

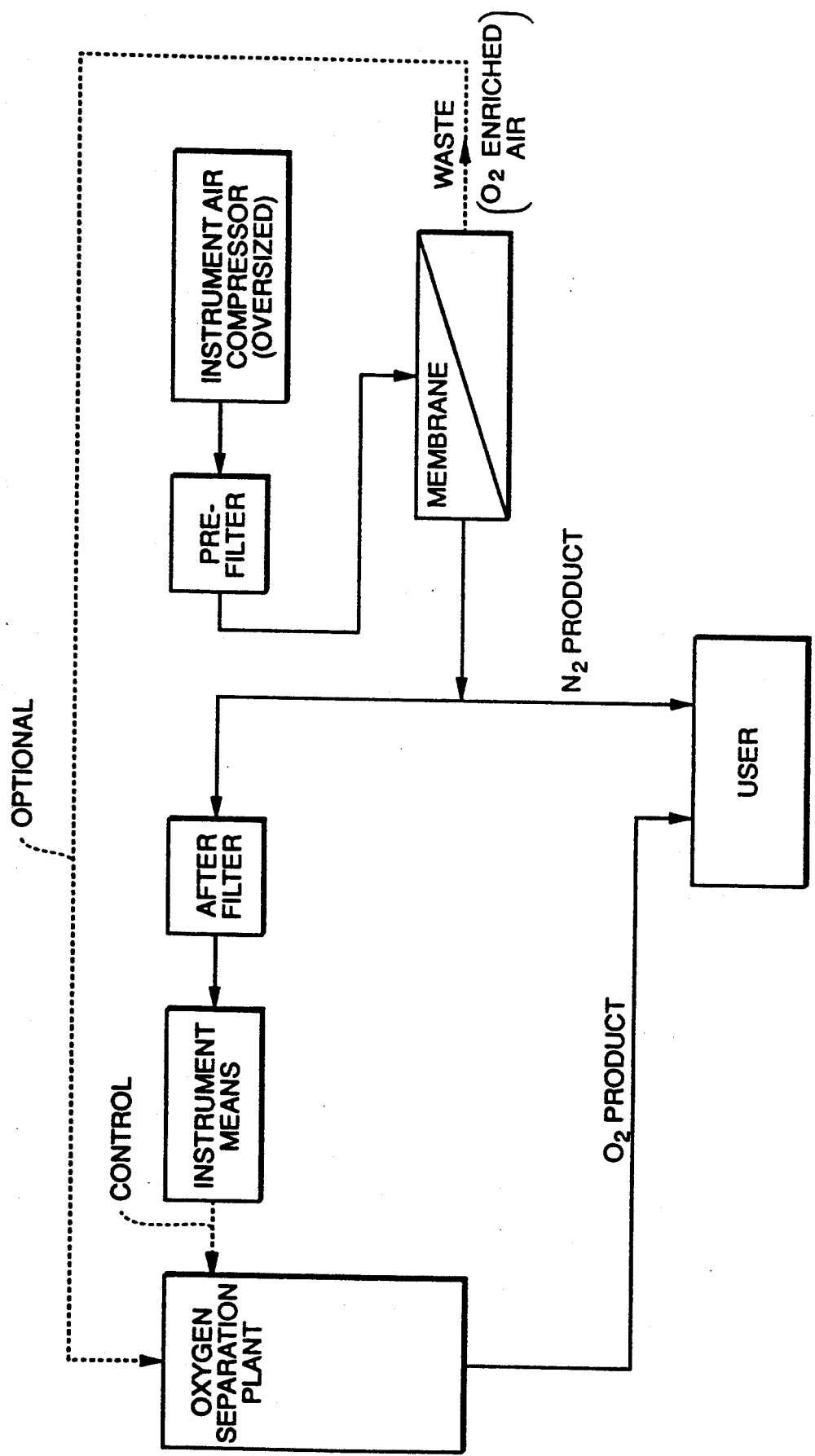
FIG._4

PROCESS FOR SUPPLYING NITROGEN FROM AN ON-SITE PLANT

BACKGROUND OF THE INVENTION

1. Field of the Invention

The present invention relates to a process for supplying nitrogen from an on-site plant.

2. Description of the Background

For a wide variety of industrial plants, it would be quite advantageous to produce nitrogen on-site. For example, it would be quite useful to produce a nitrogen stream on-site from chemical plants or steel plants where blanketing with an inert gas stream is often required, or in pulp and paper mills, where it is often necessary to pad chemical rail cars or tanks with nitrogen. In those plants where a huge amount of nitrogen is necessary, it is generally cheaper to connect the plant to a nitrogen pipeline fed by a nitrogen plant which could be remote from the said plants.

When the requirements are not too important, the customer usually has a tank which is regularly filled up with liquid or bulk nitrogen. This solution might be sometime expensive if only a small amount of gas is consumed. There are also cases where the purity required by the customer is either less than that of the bulk product or, on the contrary, is higher than that of the bulk product, e.g. for high technologies purposes such as semi-conductor industry or the like. There is presently no simple and cheap solution to achieve that goal.

In addition to the above, there is a need for some customers having on-site oxygen plants such as a PSA oxygen plant, for a small quantity of nitrogen which purity might be different from one customer to another or which purity might vary over the time on one site according to the customer's need. For example, some customers need a source of nitrogen of controllable purity or of variable flow rate, or both.

When a customer requires large amounts of oxygen, such as in excess of about 15 tons per day or more, oxygen is usually supplied on-site by an oxygen plant. At present, there are two principal commercial types of oxygen plants in operation. First, there are cryogenic plants, which utilize air liquefaction and distillation, and second, there are non-cryogenic plants based on pressure swing adsorption (PSA), vacuum swing adsorption (VSA), or a mixture of both. For a number of classical oxygen applications, a small quantity of nitrogen is also required for purge, transfer, blanketing, processing and/or other purposes.

Although new oxygen cryogenic plants can also be designed to produce a stream of nitrogen, the addition of an extra nitrogen capacity would be an advantageous feature, particularly if it can be at a different purity. However, existing oxygen cryogenic plants often have little or no nitrogen capability. Moreover, oxygen plants based upon PSA or VSA, do not allow for the recovery of a side nitrogen stream from the adsorption process.

Thus, in general, a need continues to exist for a means of supplying nitrogen from any industrial plant having a need therefor.

SUMMARY OF THE INVENTION

The invention essentially consists in oversizing the compressor means provided in a new plant such as chemical plant or air separation plant, when such means are provided, and using the additional compressed air to feed a nitrogen membrane to provide some on-site nitrogen product to fulfill the on-site nitrogen requirements of the plants (or some additional on-site requirements). For existing plants, which existing compressor means can be boosted, or which compressor means need to be changed for whatever reason, the additional compressed air available is used to feed a nitrogen membrane. The invention is particularly useful in those cases where there is a need of a small quantity of nitrogen in the plant, particularly when the requirements of nitrogen can be of different flowrates and/or purity at different periods of time. It is also particularly useful in cases where a plant is connected to pipelines providing nitrogen and/or oxygen, when there is an additional need of nitrogen of different purity (e.g. low purity compared to the nitrogen provided by pipeline), or when only an oxygen pipeline exists and a small amount of nitrogen is necessary, which purity might be different from one customer to another or different during different periods of time for the same customer.

BRIEF DESCRIPTION OF THE DRAWINGS

FIG. 1 illustrates an oxygen plant and its related instrument air compressor and control system, according to the prior art.

FIG. 2 illustrates a basic embodiment of the present invention based upon an oxygen plant, having a built-in instrument air compressor which may be used in cryogenic, PSA and/or VSA oxygen plants.

FIG. 3 illustrates another embodiment of the present invention based upon an oxygen plant, wherein connection to compressed air may be before or after drying as indicated by a dashed line.

FIG. 4 illustrates another embodiment of the present invention wherein the instrument air dryer is removed and is replaced by the membrane separator, which is sized so as to supply the requirements of the external nitrogen application(s) and of the instrument gas stream.

DETAILED DESCRIPTION OF THE PREFERRED EMBODIMENTS

In accordance with the present invention, a process is provided for producing nitrogen in an economical manner from an on-site plant, for example, an oxygen plant regardless of the process by which the oxygen is produced.

The present invention is based o the fact that certain plants have a need for small quantities of nitrogen on a regular basis or from time to time, which need is expensive to be fulfilled, while at the same time there are already means available on site to make compressed air, usually to drive instruments which are used to conduct the process of the plant. The plant may be, for example, a chemical plant with an instrument air compressor. The plant may also be an air separation plant having an instrument air compressor. However, even if the plant has an instrument air compressor, the main compressor (or the instrument compressor) used is oversized to also feed a nitrogen-producing membrane.

Where the on-site plant already produces nitrogen (e.g., a cryogenic air separation plant), the membrane can produce nitrogen of a purity and/or pressure which is different from that of the nitrogen produced by the plant.

According to one aspect, the present invention provides a process for supplying nitrogen from an on-site plant, the plant comprising compressor means and equipment means, at least some of the equipment means being fed by compressed air from the compressor means, said process comprising:

a) feeding an air stream to said compressor means which is oversized relative to the compressed air needs to feed the equipment means;

b) feeding at least a portion of the compressed air stream from said compressor means to a nitrogen membrane separator, thereby providing a stream of nitrogen product; and c) venting an oxygen-enriched air-stream from the membrane.

Additionally, in the above process, the oxygen-enriched air may be recovered from the membrane instead of venting the same.

Further, the above process may entail the additional step of feeding another membrane with the oxygen-enriched air stream from the nitrogen membrane.

In accordance with this process, it is also advantageous if the other membrane is a nitrogen membrane. It is, moreover, also preferred if the compressor means is an instrument air compressor and wherein the equipment means are instrument means dedicated to the control of the on-site plant.

In accordance with another aspect of the present invention, a process is provided for supplying nitrogen from an on-site air separation plant providing at least oxygen product, the plant comprising compressor means to compress air needed for said separation plant, the process comprising the steps of:

a) feeding an air stream to the compressor means which is oversized relative to the compressed air needs of the on-site separation plant; and b) feeding at least a portion of the compressed air stream from the compressor means to at least one nitrogen membrane separator, thereby providing a stream of nitrogen product.

In accordance with this process, the air separation plant can provide also nitrogen product and the stream of the nitrogen product from the membrane has a different purity and/or pressure than that provided by the air separation plant.

In yet another aspect thereof, the present invention provides a process for supplying nitrogen from an on-site oxygen plant, the oxygen plant comprising a separation plant to separate oxygen from an oxygen-containing gas mixture, such as air, an instrument air compressor and equipment means such as valves or the like, actuated by compressed air from the instrument air compressor, the process comprising:

a) feeding an air stream to the instrument air compressor which is oversized relative to the compressed air needs to actuate said equipment means, and b) feeding at least a portion of the compressed air stream from the instrument compressor to a nitrogen membrane separator, thereby providing a stream of nitrogen product.

In accordance with any of these processes, the oxygen-enriched air stream may be recovered from the membrane instead of venting the same.

Additionally, the process may further entail feeding another membrane with the oxygen-enriched air stream from the nitrogen membrane.

Further, it is advantageous if the other membrane is a nitrogen membrane, and it is preferred if the compressor means is an instrument air compressor and wherein the equipment means are instrument means dedicated to the on-site plant control.

In any of the processes of the present invention, however, an additional step may be used wherein the nitrogen product is passed from the membrane separator to an oxygen-removing means, such as a deoxo unit or a getter system, to deliver high-purity nitrogen.

In accordance with any of the present processes, it is preferred if the on-site plant is a cryogenic air separation unit, a pressure swing adsorption unit or vacuum swing adsorption unit, or any combination thereof.

It is particularly advantageous, if pressure swing adsorption or vacuum swing adsorption or both are used, to further inject waste exhaust gas therefrom, which is enriched in nitrogen gas, to the air instrument compressor intake. It is, moreover, also advantageous to further recover the waste oxygen-rich stream from the at least one membrane separator and injecting the same at the inlet of one or more adsorbers of a VSA unit.

For the specific application to on-site oxygen plants, the present invention may be practiced in conjunction with any conventional cryogenic, PSA or VSA process.

In a typical cryogenic process, for example, air is compressed to a sufficient pressure in a compressor. A main exchanger precools the air against effluent product streams and extracts carbon dioxide and moisture through condensation and solidification. An expander provides the process refrigeration, while high-pressure and low-pressure columns separate the oxygen and nitrogen primary components and concentrate argon. A crude argon column may further separate argon from oxygen.

As air is cooled in the main exchanger, moisture and carbon dioxide are condensed and solidified. At regular intervals, the air passages and waste nitrogen vent passages are switched so that the air flows through clean passages and begins to build up a deposit of moisture and carbon dioxide. At the same time, returning waste nitrogen revaporizes the deposited water and carbon dioxide, thereby cleaning the passage ways, for the next switch. Alternatively, air can be purified from moisture and carbon dioxide by means of a regeneration adsorption process.

The double distillation column efficiently separates oxygen and nitrogen, affording high recovery of components from air.

For example, EP-A-081178 discloses an oxygen gas production apparatus containing a single pressure distillation column fed by an air compressor powered by a gas turbine, which in turn is fed by pressurized gas coming from the combustion of the oxygen containing nitrogen waste with fuel gas.

Adsorption based processes such as Pressure Swing Adsorption and/or Vacuum Swing Adsorption, known respectively as VSA and/or PSA processes, are based on a procedure in which the gas content of the crude gas mixture which has the higher affinity for the adsorbent is held on the surface of the adsorbent in an adsorption step, and the less strongly adsorbed components are stripped off from the adsorber filled with adsorbent.

In PSA, desorption of the adsorbed phase is achieved by reducing the pressure after the adsorption step and usually with rinsing of the adsorbent with some of the gas adsorbed less strongly, and in particular under a pressure of 1 bar or more. However, the desorption pressure may be reduced to a pressure of less than 1 bar by means of a vacuum pump, and the adsorbent is also rinsed with some of the gas adsorbed less strongly. Processes using such vacuum desorption are VSA processes.

In a typical pressure swing adsorption process, for example, utilizing the differential adsorption of nitrogen and air impurities from oxygen on zeolites, a first unit of a multiple bed system is pressurized, each of which contains two strata, the first removing water and carbon dioxide, the second adsorbing nitrogen from the flowing air. Oxygen product then passes on to the product compressor if required. Depending upon the operating cycle and conditions, the product may be up to 95% oxygen by volume, with the balance argon and nitrogen. A typical PSA process is disclosed in U.S. Pat. No. 3,866,428, incorporated herein as a reference.

Typical VSA processes are described in U.S. Pat. No. 3,493,296, 4,684,377 or 5,015,271, incorporated herein as references. U.S. Pat. No. 5,015,271 discloses a two-adsorber VSA system which requires only slightly higher energy consumption than the three-adsorber VSA system, but which is more favorable in terms of plant investment requirements due to the small number of valves and adsorbers used. The disclosed process operates the two adsorbers alternately so that the crude gas feed and the desorption of the adsorbate is not stopped at any time during the separation process, and separation of the crude gas partly occurs under reduced pressure when the maximum adsorption pressure has been reached.

In accordance with the present invention, and particularly in using any cryogenic, PSA and/or VSA process, an instrument air compressor is utilized which is oversized relative to the required needs of the plant. However, the compressor may be connected to the other components of the air separation system in a variety of ways.

For example, the membrane separator may be connected to the instrument air compressor before the air dryer. In such a case, only the external nitrogen application(s) will be supplied by the membrane separator and the dry instrument air supply necessary to the operation of the PSA or VSA will still be supplied from the instrument air dryer.

As another alternative, the membrane separator may be connected after the instrument air dryer in order to benefit from the purification of the air from such a system. However, as in the previous arrangement, only the external nitrogen application(s) will be supplied from the membrane separator.

Further, the instrument air dryer may be removed and replaced by the membrane separator. This separator is sized so as to supply the requirements of the external nitrogen application(s) and of the instrument gas stream. This gas stream is then not air, but a dry nitrogen stream from the membrane separation.

Additionally, in accordance with the present invention, as the membrane separator is made of several membrane bundles, it may be arranged into two or more bundle banks supplying nitrogen at various purities and pressures for the external application(s) and/or instrument gas requirements in order to ensure the maximum cost-effectiveness of the overall system. For example, the external application(s) may be at 99% nitrogen purity, whereas the purity of the instrument gas may be at 90%. As the purity of the nitrogen gas from the membrane system of a given permeation area is a function of the flowrate of intake air, this means that less fibers from the bundle are necessary to make 90% purity nitrogen at the same flowrate than to make 99% purity nitrogen. Either the banks have the same permeation areas, which means that less 99% than 90% nitrogen will be produced or they have different permeation areas, which means that each flowrate can be adapted, including the same flowrates for both.

Regarding the various possibilities of using a membrane or several membranes arranged together, reference is hereby made to the copending applications of Brugerolle et al. and Barbe et al. which are incorporated herein as references, and which were filed on Jun. 3, 1991 and Jul. 2, 1991 under Ser. Nos. 07/709,226 and 07/725,773, respectively.

However, the present invention may be practiced in conjunction with any cryogenic, PSA or VSA process using any arrangement of elements with the oversized compressor.

In addition to the above illustrative embodiments, a variety of other modifications may also be used.

For example, a purification unit such as a deoxo or getter unit, may be installed downstream after the membrane separator, so as to produce a high purity nitrogen stream. A deoxo unit is a unit wherein usually some hydrogen is provided to have a catalytic combustion with the oxygen present in the nitrogen gas. A getter unit has the same deoxidation function using, e.g., silane gas $SiH_4$ in a small amount which is a strong reducing agent reacting with the oxygen under well-known conditions.

Additionally, the membrane unit may be installed indoors in the same building as the cryogenic, PSA and/or VSA for every weather protection and maintenance.

Moreover, the membrane unit may be operated with the same computer, programmable logic controller or controls, as the rest of the cryogenic, PSA and/or VSA.

Further, the instrument air intake and the waste exhaust gas of the PSA and/or VSA may be connected. This allows the feeding of a gas already enriched in nitrogen to the membrane separator instead of straight air. An intermediate buffer tank with adequate condensate purges may be required.

Also, the waste oxygen rich stream gas from the membrane separator may be recovered and injected at the inlet of the PSA and/or VSA adsorbers, either upstream or downstream of the PSA air compressor or VSA air blower.

In order to further illustrate the present invention, FIGS. 1–4 will now be described in more detail.

FIG. 1 illustrates the basic features, for the purpose of the present invention, of an oxygen plant according to the prior art. The separation plant which produces oxygen product can be of any type (PSA, VSA, cryogenics, etc.) as previously disclosed and is controlled by instrument means which are valves, actuators, etc. Those instrument means are pneumatically controlled means which need compressed air (or gas) to actuate them. The plant thus comprises an instrument air (or gas) compressor feeding the instrument means through e.g. a prefilter, an instrument air dryer and an after filter. The instrument air compressor is sized to the needs of compressed air of the instrument means.

FIG. 2 represents one embodiment of the invention in case of an oxygen plant. The oxygen plant is basically identical to that of FIG. 1 (even if prefilter, dryers and after filter have not been represented). But the instrument air compressor is oversized compared to that of FIG. 1, in such a way that said oversized compressor is also able to feed a nitrogen membrane system made of a bundle, of hollow fibers, usually made of polymer such as polyamide, polyimide, polysulfane, as the like, said bundle being located in sealed case, the compressed air feeding the outside of the fibers while oxygen preferably permeates through the wall of the hollow fiber (permeate gas) and nitrogen does not permeate (non-permeate gas). The non-permeate gas, which can be nitrogen having an excellent purity, is recovered as a product sent to the user while the permeate, which is oxygen-enriched gas (compared to air), is vented (waste gas) or might be recovered and used as a by-product.

FIG. 3 illustrates an embodiment of the invention which is similar to FIG. 2 except that the compressed air which feeds the membrane is either taken at the output of the prefilter and can thus contain some moisture or after drying and another filtering when dry air is necessary, which is better for the membrane (wet air might be detrimental to the membrane).

FIG. 4 illustrates the case where the instrument means are actuated by the compressed nitrogen from the membrane system. After prefiltering, the compressed air is fed to the membrane and the nitrogen product is used both by the user and after filtering to actuate the instrument means. Optionally, the waste oxygen enriched gas is recovered to feed the air separation plant, particularly in the case of a PSA/VSA oxygen unit where this can improve the overall yield of the system.

For each of the FIGS. 2 to 4, the temperature and/or pressure of the membrane system may be controlled in accordance with the copending application of Brugerolle et al., filed Jun. 3, 1991, Ser. No. 07/709,226, which application is incorporated herein by reference, which can in some cases allow to generate high purity nitrogen such as required in electronics, with an acceptable flow rate.

Moreover, for the apparatus of each figure, the membrane separator may be a cascade system as described in the copending application Barbe et al., filed Jul. 2, 1991, Ser. No. 07/725,773, which application is incorporated herein by reference. However, any type of membrane cascade system providing different nitrogen purities may be used, such as low purity for the instrument means and higher purity for the user.

Additionally, even though it is preferred to use a membrane to produce nitrogen product, a nitrogen PSA may be used instead of the membrane, while still being within the scope of the present invention.

Having described the present invention, it will now be apparent to one of ordinary skill in the art that many changes and modifications can be made to the above-described embodiments without departing from the spirit or the scope of the present invention.

I claim:

1. A process for supplying nitrogen from an on-site air separation plant providing at least oxygen as a product, said air separation plant comprising means to feed air to air separation means which separates oxygen from nitrogen to produce at least oxygen as a product, instrument-air means dedicated to operate or control, or operate and control the plant during at least certain periods of time during which the air separation occurs, the instrument-air means being actuated by compressed air and instrument-air compressor means to compress air and to generate compressed air to feed the instrument-air means to operate or control or operate and control the plant, the process comprising:

a) feeding an air feed stream to said instrument-air compressor means which is oversized relative to the compressed air required to feed the instrument-air means, b) feeding at least a portion of the compressed air stream from the instrument-air compressor means to a nitrogen membrane separator, thereby providing a stream of nitrogen product, and c) venting an oxygen-enriched air stream from the membrane.

2. The process of claim 1, which further comprises feeding said compressed air stream from said compressor to a dryer or filters, or dryer and filters prior to feeding the same to said membrane separator.

3. The process of claim 1, wherein said nitrogen membrane separator is arranged into two or more bundle banks supplying nitrogen at various purities and pressures.

4. The process of claim 1, which further comprises passing said stream of nitrogen product from said membrane separator to oxygen removing means, to deliver high purity nitrogen.

5. The process of claim 4, wherein the oxygen removing means is a deoxo or a getter unit.

6. The process of claim 1, wherein said on-site plant is a cryogenic air separation unit.

7. The process of claim 1, wherein said on-site plant is a pressure swing adsorption unit or vacuum swing adsorption unit or both.

8. The process of claim 7, which further comprises injecting waste exhaust gas from said pressure swing adsorption or vacuum swing adsorption or both which is enriched in nitrogen gas to the air instrument compressor intake.

9. The process of claim 7, which further comprises recovering the waste oxygen-rich stream from at least one membrane separator and injecting the same at an inlet of one or more adsorbers of the PSA unit or VSA unit or both.

10. The process of claim 1, which comprises recovering the oxygen-enriched air stream from the membrane instead of venting the same.

11. The process of claim 1, which further comprises feeding another membrane with the oxygen-enriched air stream from the nitrogen membrane instead of venting it.

12. The process of claim 1, wherein said another membrane is a nitrogen membrane.

13. A process for supplying nitrogen from an on-site oxygen plant, said oxygen plant comprising a separation plant to separate oxygen from an oxygen-containing gas mixture to produce at least oxygen as a product, instrument air-means dedicated to operate or control or operate and control the plant during at least certain periods of time during which the separation of the oxygen-containing gas mixture occurs, the instrument-air means being actuated by compressed air and compressor means to compress said oxygen-containing gas mixtures and to generate compressed oxygen-containing gas mixtures to feed said instrument-air means to operate or control or operate and control the plant, the process comprising:

a) feeding an oxygen-containing gas mixture stream to said compressor means which is oversized relative to the compressed air required to feed said instrument means, and b) feeding at least a portion of the compressed oxygen-containing gas mixture from said compressor means to a nitrogen membrane separator, thereby providing a stream of nitrogen product.

14. The process of claim 13, further comprising the step of venting the oxygen-enriched air stream from the membrane.

15. The process of claim 14, comprising recovering the oxygen-enriched air stream from the membrane instead of venting it.

16. The process of claim 15, further comprising feeding another membrane with the oxygen-enriched air stream from the nitrogen membrane.

17. The process of claim 16, wherein said another membrane is nitrogen membrane.

18. The process of claim 13, wherein said instrument means are instrument means dedicated to controlling said on-site plant.

19. The process of claim 13, which further comprises passing said stream of nitrogen product from said membrane separator to oxygen-removing means, to deliver high purity nitrogen.

20. The process of claim 19, wherein the oxygen-removing means is a deoxo or a getter unit.

21. The process of claim 13, wherein said on-site oxygen plant is a cryogenic air separation unit.

22. The process of claim 13, wherein said on-site oxygen plant is a pressure swing adsorption unit or vacuum swing adsorption unit or both.

23. The process of claim 22, which further comprises injecting waste exhaust gas from said pressure swing adsorption or vacuum swing adsorption or both, which is enriched in nitrogen gas, to the air instrument compressor intake.

24. The process of claim 13, which further comprises recovering the waste oxygen rich stream from at least one membrane separator and injecting the same at an inlet of one or more adsorbers of a VSA unit.

25. A process for supplying nitrogen from an on-site air separation plant providing at least oxygen product, said air separation plant comprising means to feed air to air separation means which separates oxygen from nitrogen to produce at least oxygen as a product, instrument air means dedicated to operate or control, or operate and control the plant during at least certain periods of time during which the air separation occurs, the instrument-air means being actuated by compressed air and instrument-air means to compress air and to generate compressed air to feed the instrument-air means to generate or control or operate and control the plant, the process comprising:
  a) feeding an air stream to said compressor means which is oversized relative to the compressed air required to feed the on-site separation plant, and
  b) feeding at least a portion of the compressed air stream from said compressor means to at least one nitrogen membrane separator or nitrogen pressure swing adsorption unit, thereby providing a stream of nitrogen product.

* * * * *